United States Patent
Hennes

(10) Patent No.: US 11,287,307 B2
(45) Date of Patent: Mar. 29, 2022

(54) FLOOR ELEMENT FOR INSTALLATION IN A FLOOR OF A BUILDING ROOM AND SYSTEM COMPRISING SUCH A FLOOR ELEMENT

(71) Applicant: Viega Technology GmbH & Co. KG, Attendorn (DE)

(72) Inventor: Frank Hennes, Finnentrop (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 30 days.

(21) Appl. No.: 16/867,646

(22) Filed: May 6, 2020

(65) Prior Publication Data
US 2020/0355545 A1 Nov. 12, 2020

(30) Foreign Application Priority Data

May 7, 2019 (DE) .................... 10 2019 111 794.1

(51) Int. Cl.
| | | |
|---|---|---|
| G01G 19/52 | (2006.01) | |
| G01G 19/44 | (2006.01) | |
| G01G 23/36 | (2006.01) | |
| A47K 3/40 | (2006.01) | |

(52) U.S. Cl.
CPC ............ *G01G 19/52* (2013.01); *A47K 3/405* (2013.01); *G01G 19/44* (2013.01); *G01G 23/36* (2013.01)

(58) Field of Classification Search
CPC ........ G01G 19/52; G01G 21/28; G01G 19/44; G01G 23/36; A47K 3/405
See application file for complete search history.

(56) References Cited

U.S. PATENT DOCUMENTS

| | | | | | |
|---|---|---|---|---|---|
| 1,883,496 | A | * | 10/1932 | Berson .................... | G01G 19/44 177/142 |
| 2,924,443 | A | * | 2/1960 | Townsend .............. | G01G 19/44 177/142 |
| 3,187,826 | A | * | 6/1965 | Traff ..................... | G01G 19/44 177/142 |

(Continued)

FOREIGN PATENT DOCUMENTS

| | | |
|---|---|---|
| DE | 19702357 B4 | 1/2007 |
| DE | 202012102345 U1 | 10/2013 |

(Continued)

OTHER PUBLICATIONS

Conomputer translation of DE 19702357 downloaded from the EPO website on Jul. 31, 2021.*

(Continued)

*Primary Examiner* — Randy W Gibson
(74) *Attorney, Agent, or Firm* — The Webb Law Firm

(57) ABSTRACT

The invention relates to a floor element (1) for installation in a floor of a building room, in particular a sanitary room, which is provided with a personal scale (3), preferably an electronic or electromechanical personal scale, or a measuring device for measuring a measured variable proportional to the weight force. The floor element (1) is preferably designed as a shower tray or shower floor element. Furthermore, the invention relates to a system comprising such a floor element (1) and a display device (10), wherein the display device (10) can be remotely and/or variably positioned relative to the floor element (1).

14 Claims, 3 Drawing Sheets

(56) References Cited

U.S. PATENT DOCUMENTS

| | | | | |
|---|---|---|---|---|
| 6,781,067 B2* | 8/2004 | Montagnino | .......... | G01G 19/44 |
| | | | | 177/142 |
| 6,864,436 B1* | 3/2005 | Nobes | .................... | G01G 19/44 |
| | | | | 177/126 |
| 6,900,398 B1 | 5/2005 | Lee | | |
| 10,677,640 B2* | 6/2020 | Dehner | .................. | G01G 21/28 |

FOREIGN PATENT DOCUMENTS

| | | |
|---|---|---|
| DE | 102012105555 A1 | 1/2014 |
| DE | 202014008943 U1 | 3/2016 |
| WO | 2012104451 A1 | 8/2012 |

OTHER PUBLICATIONS

Conomputer translation of WO 2012/104451 downloaded from the EPO website on Jul. 31, 2021.*

* cited by examiner

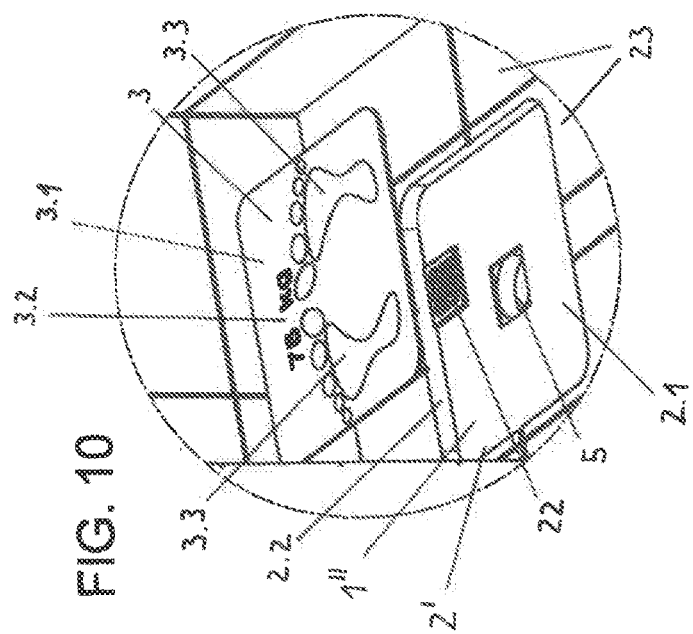
FIG. 9
FIG. 10
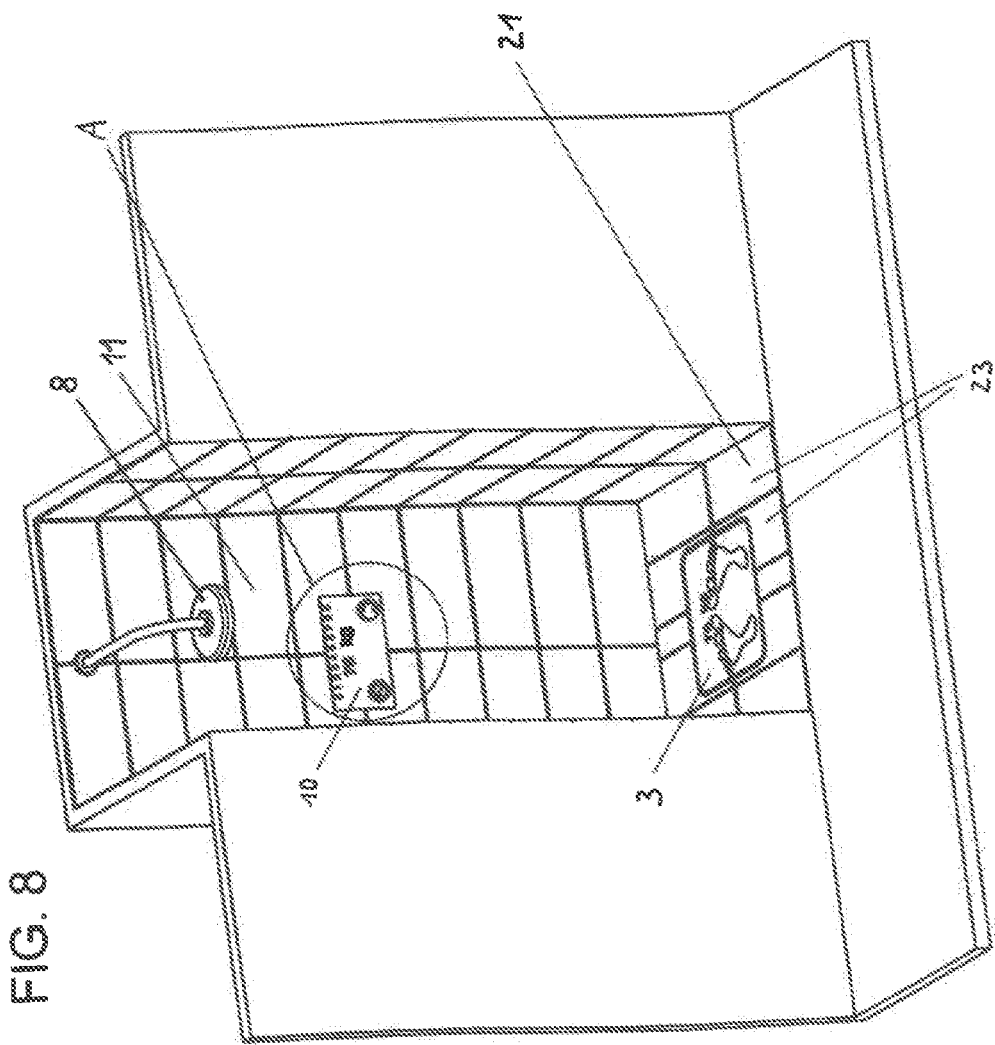
FIG. 8

FLOOR ELEMENT FOR INSTALLATION IN A FLOOR OF A BUILDING ROOM AND SYSTEM COMPRISING SUCH A FLOOR ELEMENT

CROSS-REFERENCE TO RELATED APPLICATION

This application claims priority to German Patent Application No. 10 2019 111 794.1 filed May 7, 2019, the disclosure of which is hereby incorporated by reference in its entirety.

BACKGROUND OF THE INVENTION

Field of the Invention

The invention relates to a floor element for installation in a floor of a building room, in particular a sanitary room. Furthermore, the invention relates to a system comprising such a floor element and a display device.

Description of Related Art

Personal scales are known in many different designs. In private households, personal scales are usually placed in bathrooms. In many cases, however, personal scales are perceived as disturbing, for example, because they take up space that should or could be used for other purposes, or because they disturb the aesthetic perception of the user of a bathroom designed in a design-oriented manner, especially in a reduced style of furnishing. The design of many personal scales does not harmonize with the design of the bathroom furnishings. Furthermore, dust is deposited on personal scales, as on other furnishings, which is why personal scales are often pejoratively referred to as "dust catchers". Dusting personal scales is perceived as annoying.

The invention is based on the object of eliminating at least one of the problems mentioned above.

SUMMARY OF THE INVENTION

This object is solved by a floor element having the features mentioned below.

The floor element in accordance with the invention is designed for installation in a floor of a building room, in particular a sanitary room, preferably substantially in the form of a trough or plate, and is provided with a personal scale, preferably an electronic or electromechanical personal scale, or a measuring device for measuring a measured variable proportional to a weight force.

In a preferred configuration, the floor element according to the invention is designed as a shower tray or shower floor element. In this way, the space of a shower, for example a shower cell, can additionally be used for the arrangement of a personal scale or a measuring device for measuring a measured variable proportional to the weight force. This means that a floor area of the bathroom outside the shower, in which a conventional personal scale would be placed, can be used for other purposes. This is particularly advantageous for small bathrooms. Furthermore, the invention allows a personal scale to be placed inconspicuously so that the design of the bathroom or other room in the building is not affected by the personal scale. By arranging, preferably integrating, the personal scale or the measuring device for measuring a measured variable proportional to the weight force in a floor element designed as a shower tray or shower floor element, a "dirt catcher" in the form of a conventional personal scale is also avoided. Every time the shower, for example the shower tray or the tiled floor of a walk-in shower, is cleaned, the tread surface of the personal scale or the measuring device is cleaned at the same time.

In the context of the present invention, the term "floor element" also includes, for example, shower trays or shower trays flush with the floor as well as so-called shower boards.

A further configuration of the invention is characterized in that the floor element has a receptacle, preferably a recess, in or on its upper side for receiving the measuring device or the personal scale. In this case, the personal scale can be manufactured in particular as a self-sufficient personal scale. This design is advantageous from a production engineering point of view, because it enables separate prefabrication or finishing of the measuring device or personal scale to be inserted into the receptacle by a manufacturer, in particular a supplier, who specializes in this, while the floor element having the receptacle, for example a suitably designed shower tray or shower floor element, is manufactured elsewhere, preferably by a sanitary manufacturer who specializes in this. Inserting the measuring device or personal scale into the receptacle of the floor element in accordance with the invention is simple and can be carried out quickly by a sanitary fitter or the end customer. The dimensions and the design of the personal scale or measuring device to be inserted into the receptacle on the one hand and the dimensions of the receptacle and the design of the shower tray on the other hand are coordinated between the various manufacturers.

The receptacle of the floor element is advantageously designed in such a way that the measuring device or personal scale to be inserted into it is inevitably centered when inserted and in particular aligned to fit the floor element. The personal scale or measuring device for measuring a measured variable proportional to the weight force can preferably be inserted into the receptacle in a removable manner.

In this context, for example, the personal scale may have feet or spacers on its underside so that it is at a distance from the base of the receptacle when inserted therein. In the base of the receptacle, preferably elongated troughs are formed for centering the personal scale. The longitudinal axes of these troughs preferably run in the direction of a drain opening and preferably essentially at right angles to each other. The feet or spacers of the personal scale engage positively in the troughs when the personal scale is inserted, whereby the personal scale is centered in the receptacle and defines with it a circumferential inlet gap, through which water flowing from a shower head can flow to the drain opening.

According to a further configuration, a drain opening is formed in the recess. The drain opening is preferably the only drain opening of the floor element designed in accordance with the invention, for example in the form of a shower tray or shower floor element. The drain opening is preferably covered by the personal scale or measuring device inserted in the recess. Furthermore, the drain opening can be provided with a grid-shaped drain grating. The drain grating can prevent the ingress of small objects such as closing caps, pieces of jewelry or the like.

A further configuration of the floor element in accordance with the invention provides that the measuring device or personal scale has a tread surface which, together with the receptacle, delimits an inlet gap, preferably a circumferential inlet gap. Thus, it is possible to create a shower with integrated personal scale that is characterized by an aesthetically pleasing shower tray or floor surface. Preferably, the tread surface and the upper side of the floor element surrounding the receptacle are flush with each other.

The tread surface of the measuring device or personal scale is preferably provided with a marking that instructs the user to an ideal standing position for measuring his weight. The marking may consist of an image of footprints, for example.

A further configuration of the invention provides that a display device for displaying measured weight values and/or other measured values is integrated in the tread surface. This design is useful if a self-sufficient personal scale is to be inserted into the receptacle of the floor element according to the invention. As an alternative or in addition, a display device for displaying measured weight values and/or other measured values may also be assigned to the floor element in accordance with the invention, which is remotely and/or can be variably positioned relative to the floor element. This alternative or additional configuration is particularly advantageous for the use of the personal scale by very obese persons, since the display device can then be arranged so that it is visible to such persons and is therefore also visible.

A further advantageous configuration of the invention is characterized in that the measuring device or personal scale is provided with one or more height-adjustable spacer elements, for example height-adjustable feet. This configuration enables an optimal height alignment of the tread surface of the measuring device or personal scale relative to the surrounding shower or floor surface. In particular, this configuration is advantageous if the invention is applied in showers at floor level whose floor surface is made of tiles or natural stone slabs. The height of the tread surface of the measuring device or personal scale can then be optimally adapted to the height of tiles or natural stone slabs of varying thickness.

A further configuration of the invention is characterized in that the floor element is arranged on a floor element support which is provided with sensors for measuring a measured variable proportional to a weight force. The floor element is thereby formed, for example, as a shower tray or shower floor element and the floor element support is designed as a shower tray support or shower floor element support. This configuration offers in particular the possibility to integrate the function of a personal scale in a shower tray without having to change the construction and/or design of the shower tray. Thus the design and construction of an existing shower tray can be retained. In this case, the sensors for measuring a measured variable proportional to the weight force are connected to a measuring signal evaluation unit which is equipped with a display device that can be remotely and/or variably positioned relative to the shower tray and the shower tray support. The sensors are designed, for example, in the form of pressure transducers or load cells which have one or more strain gauges or capacitors. By means of the strain gauge a deformation is measured which is proportional to the weight force to be determined. A capacitor enables an indirect measurement of the weight force by means of an indirect displacement measurement, e.g. by changing the capacitance of the capacitor when the distance between the capacitor plates changes.

As an alternative or in addition to the sensors provided on the floor element support, a further configuration of the invention provides that the floor element, for example in the form of a shower tray or floor drain pan, is provided on its underside with sensors for measuring a measured variable proportional to a weight force. The sensors are preferably designed in the form of strain gauges.

The connection of the shower tray to the building element enclosing the shower tray, namely the floor and the wall or walls of the shower cell, is preferably designed as an elastic connection, for example in the form of a silicone joint. Furthermore, a drain fitting connected to the shower tray is connected to a waste water pipe via a flexible and/or elastic pipe section, for example a rubber hose, elastic spring bellows or a spiral hose section. The personal scale is calibrated after the shower tray has been installed.

Furthermore, the above-mentioned object underlying the invention is solved by a system comprising a floor element according to the invention, preferably according to one of the above-mentioned configurations, and a display device, the display device being remote and/or variably positionable relative to the floor element. For the transmission of the measuring signals from the measuring device or the sensors to the measuring signal evaluation unit and display device, for example, a measuring signal line is provided.

According to a further advantageous configuration of the invention, the remotely and/or variably positionable display device is provided with one or more operating elements for controlling a shower function and/or for the input of personal data. For example, the volume flow rate and/or the temperature of the shower water can be controlled via the at least one operating element. The system according to the invention also allows the installation of a user recognition system, which results in further options. For example, the personal scale can be used to determine whether the shower equipped in accordance with the invention is used by a person. The measurement signal evaluation unit can switch off a water supply if it receives measurement signals that correspond to a non-use of the shower, in particular if there is no weight load on the shower tray. Such a switch-off function can be useful in hotels or public sanitary areas, for example, to prevent unnecessary water consumption in showers.

Furthermore, it is within the scope of the invention that the personal scale arranged or integrated in the floor element according to the invention is designed as so-called body fat scale or health scale. The user of the system according to the invention can then use the display device to have other personal values displayed in addition to his weight, e.g. values of a body analysis (underweight, slightly underweight, normal weight, overweight, heavily overweight), a body fat percentage, body water percentage, muscle percentage, daily calorie requirement and bone mass. Using the at least one operating element for the input of personal data, the user can enter data such as his or her gender, age, height and/or name into a memory or processor assigned to the measurement signal evaluation unit.

BRIEF DESCRIPTION OF THE DRAWINGS

In the following, the invention is explained in more detail by means of a drawing representing several embodiments. It shows schematically:

FIG. 8 a section of a bathroom with a shower cell, which is equipped with a floor element in the form of a shower floor element and a personal scale, according to a fourth embodiment, in a perspective exploded view;

FIG. 9 an enlarged representation of detail A of FIG. 8; and

FIG. 10 a lower section of the shower cell from FIG. 8 in an enlarged exploded view, showing the bathroom scale, a drain grate and a drain opening.

DESCRIPTION OF THE INVENTION

Figure 2:
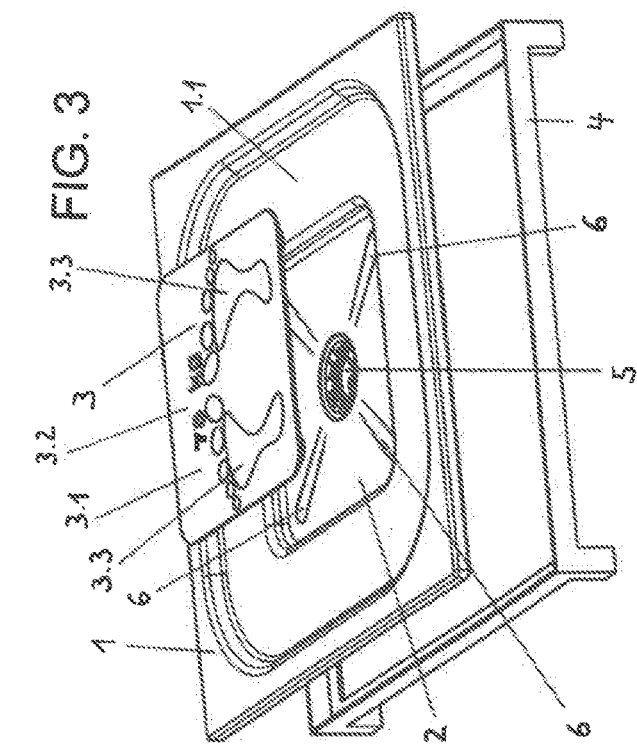
FIG. 2 an enlarged view of detail A from FIG. 1.
Figure 3:
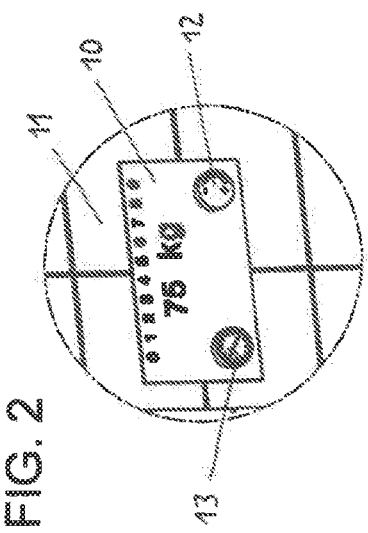
FIG. 3 the shower tray from FIG. 1 with a receptacle for a personal scale, a shower tray support and the personal scale, in a perspective exploded view.
Figure 1:
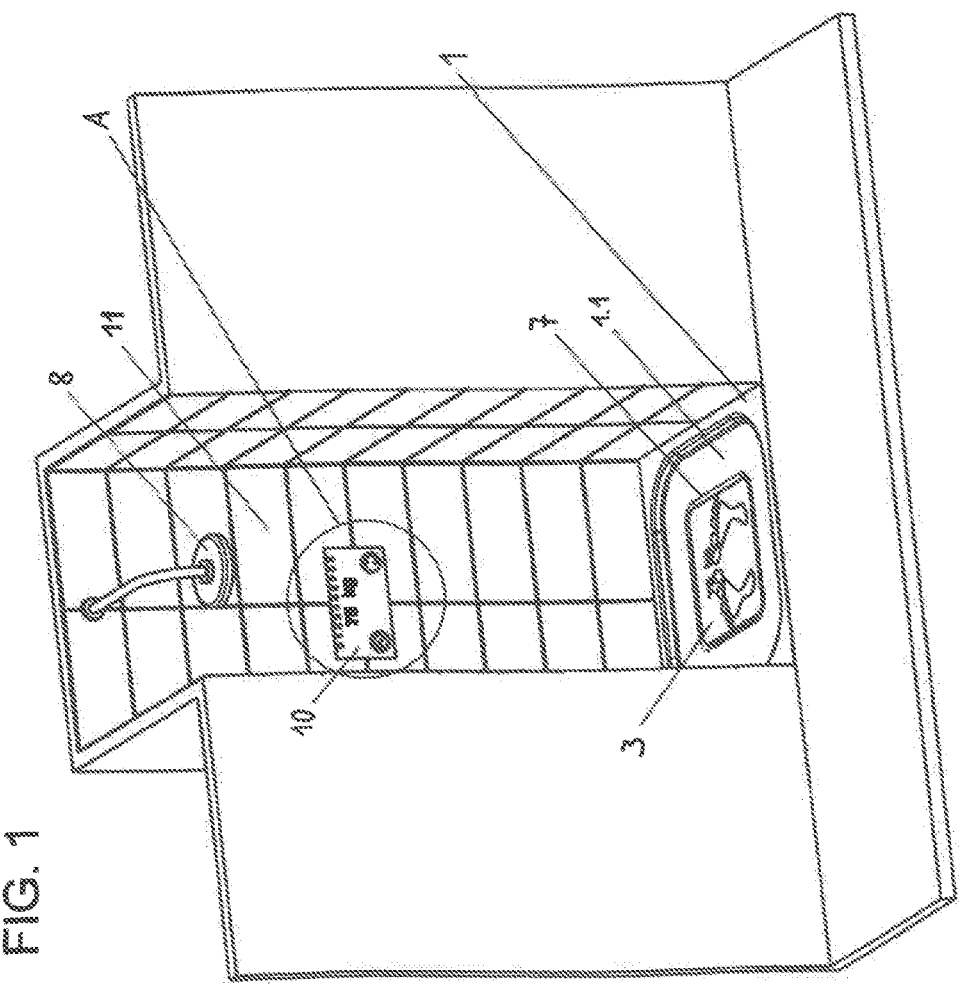
FIG. 1 a section of a bathroom with a shower cell equipped with a floor element in the form of a shower tray and a personal scale, in a perspective view.

FIGS. 1 to 3 show a first embodiment of the invention. Shown is a tray-shaped floor element 1 for installation in the floor of a bathroom. The floor element 1 is designed as a shower tray, for example. In the upper side of the shower tray 1, a recess 2 is formed to accommodate a personal scale 3. The personal scale 3 is a self-sufficient scale, which is preferably designed as an electronic or electromechanical scale and is integrated into the shower tray 1 as an additional part.

The shower tray 1, for example, is made of fiber-reinforced plastic or sheet steel, with the formed sheet steel coated with enamel. For stable storage of shower tray 1, it is mounted on a tray support 4, which is, for example, frame-shaped.

A drain opening 5 is formed in the recess (receptacle) 2 of the shower tray 1. On the underside of the shower tray 1, a drain fitting with an odor trap (cf. FIG. 7) is or is connected to the drain opening 5. The recess 2 of the shower tray 1 is designed in such a way that the personal scale 3 to be inserted in it is inevitably centered when inserted. The scale 3 has feet or spacers on its underside so that it is at a distance from the base of the recess 2 when inserted. In the base of the recess 2, elongated troughs 6 are formed for centering the scale 3. The longitudinal axes of these troughs run in the direction of the drain opening 5 and essentially at right angles to each other. The feet (spacers) of the scale 3 engage positively in the troughs 6 when the scale is inserted, whereby the scale 3 is centered in the recess 2 and defines with it a circumferential inlet gap 7, through which water flowing from a shower head 8 can flow to the drain opening 5.

The depth of the recess (receptacle) 2 and the height of the personal scale 3 are dimensioned in such a way that the tread surface 3.1 of the scale 3, when inserted, is essentially flush with the upper side 1.1 of the shower tray 1 surrounding the recess. For fine adjustment, the feet of scale 3 are preferably designed as height-adjustable spacers.

A display device 3.2 for displaying weight readings is integrated in the tread surface 3.1. Furthermore, the tread surface 3.1 of scale 3 can be provided with a marking 3.3, which indicates an ideal standing position for weight measurement to the user of the scale. Marking 3.3 consists, for example, of an image of footprints.

In addition to the display device 3.2 integrated in the tread surface 3.1, a second display device 10 may be assigned to the shower tray 1 as well as to the scale 3, the second display device 10 being remotely and preferably variably positionable relative to the shower tray 1. In the embodiment shown in FIG. 1, the second or additional display device 10 is arranged on a wall 11 of the shower cell, approximately halfway up the shower cell. The display device 10 is thus in a better viewing area than the display device 3.2 integrated in the tread surface 3.1. The display device 10 mounted on the wall 11 of the shower cell is equipped with one or more operating elements 12, 13 for controlling a shower function and/or for the input of personal data.

Figure 5:
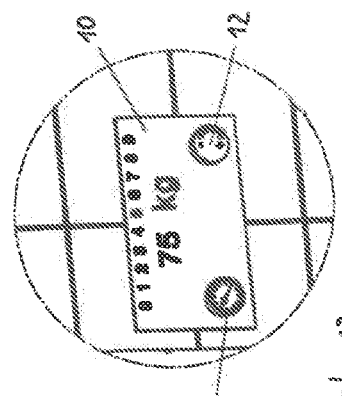
FIG. 5 an enlarged representation of detail A of FIG. 4.
Figure 6:
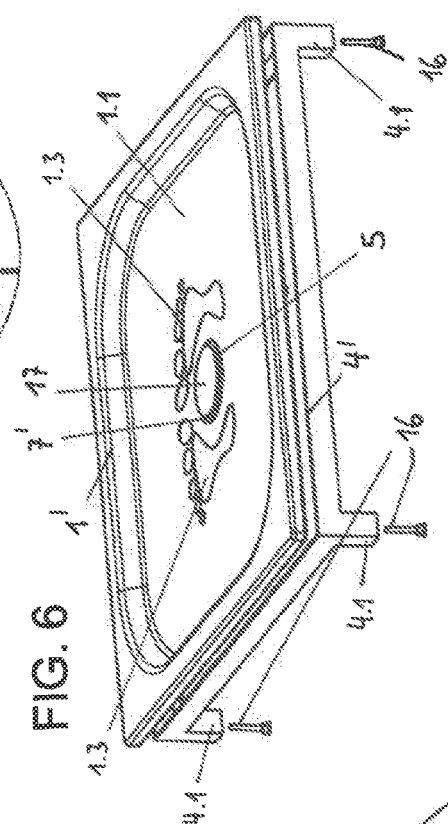
FIG. 6 the shower tray from FIG. 4, a shower tray support and pressure transducers (pressure sensors), in a perspective exploded view.
Figure 4:
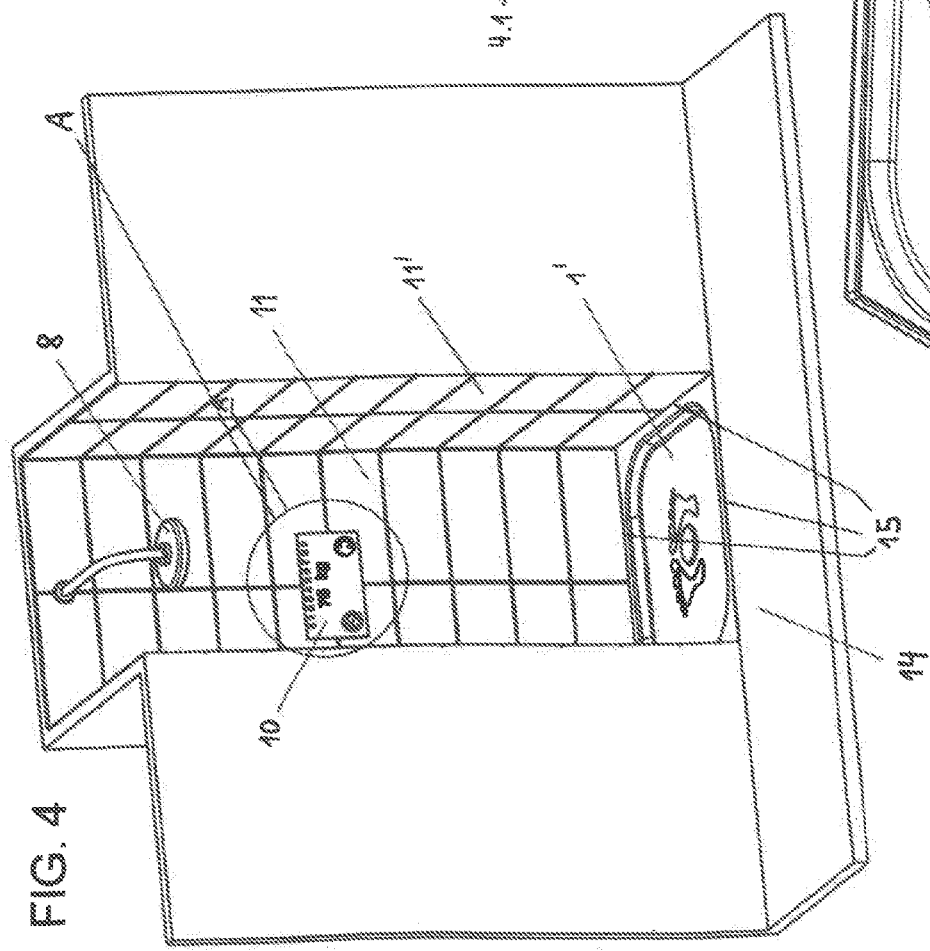
FIG. 4 a section of a bathroom with a shower cell equipped with a floor element in the form of a shower tray and an integrated weighting function, in a perspective exploded view.

FIGS. 4 to 6 show a second embodiment of the invention. Shown again is a tray-shaped floor element 1' for installation in the floor of a bathroom, whereby the floor element 1' is designed as a shower tray.

This embodiment differs from the embodiment shown in FIGS. 1 to 3 in that the shower tray 1' has no recess for accommodating a self-sufficient scale 3. The construction of the shower tray 1' can correspond to the construction and design of a normal or already existing shower tray. For stable mounting of the shower tray 1', it is mounted on a tray support 4' similar to the shower tray 1 as shown in FIG. 3. The outer edge of the shower tray 1' is elastically connected to the floor 14 and the walls 11, 11' of the shower cell. The elastic connection 15 is preferably designed in the form of an elastic sealing joint, for example a silicone joint.

In contrast to the embodiment shown in FIGS. 1 to 3, the tray support 4' is equipped with sensors 16 for measuring a measured variable proportional to the weight force. The sensors 16 are, for example, designed as pressure transducers (load cells) with one or more strain gauges or capacitors. The sensors (pressure transducers) 16 are preferably arranged on the underside of the tray support 4', for example on or in foot sections 4.1 of the tray support 4'.

The base 1.1 of the shower tray 1' also serves as a tread surface for the scale or weighing function integrated in the tray support 4'. The upper side of the shower tray base 1.1 is provided with a marking 1.3, which shows the user of the weighing function an ideal standing position for weight measurement. The marking 1.3 is located in the middle area of the shower tray bottom 1.1. This is also where the drain opening 5 of the shower tray 1' can be located, for example. The drain opening 5, for example, is provided with a cover 17 which, together with the base of the shower tray 1.1, defines a circumferential inlet gap 7' on its outer circumference.

The weight determined is displayed by means of a display device 10, which is located at a distance from the shower tray 1', for example on a wall 11 of the shower cell. The display device 10 comprises a measuring signal evaluation unit by means of which the measuring signals emitted by the sensors 16 are converted into proportional weight values. As in the embodiment shown in FIGS. 1 and 2, the display device 10 is combined with one or more operating elements 12, 13 for controlling a shower function and/or for the input of personal data.

Figure 7:
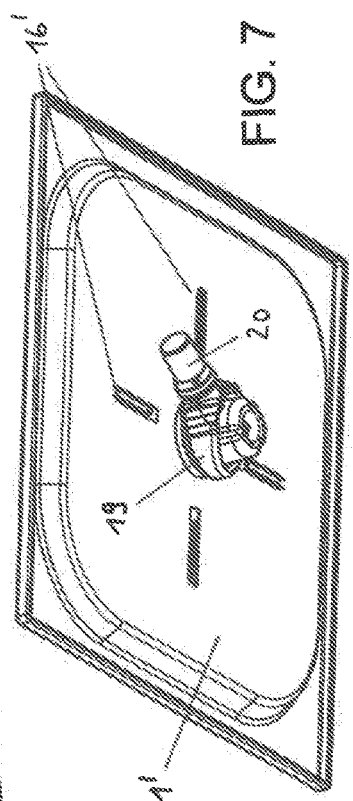
FIG. 7 the shower tray from FIG. 4 according to a third embodiment, in a perspective bottom view.

FIG. 7 shows a third embodiment of the invention in conjunction with FIGS. 4 to 6. This embodiment differs from the configuration according to FIG. 6 in that the shower tray 1' is equipped on its underside with sensors 16' for measuring a measured variable proportional to the weight force. The sensors 16' are designed in the form of strain gauges, whereby, for example, four strain gauges 16' are attached, for example glued, transversely to one another and essentially evenly spaced from one another in the central area of the shower tray 1.1. The strain gauges 16' are used to measure the deformation of the shower tray bottom 1.1, which is dependent on the load on the shower tray bottom 1.1. The measuring signals emitted by the strain gauges 16' when the shower tray 1' is loaded are converted by the measuring signal evaluation unit combined with the display device 10 into proportional weight values and the latter are displayed by the display device 10.

A drain fitting mounted on the drain opening 5 of the shower tray 1' has a drain housing 19 in which an odor trap is formed. The drain housing 19 is provided with a connection piece 20 which is connected to a wastewater pipe via a flexible, preferably elastic pipe section (not shown), for example a rubber hose section or a rubber bellows, to make it liquid-tight. The base 1.1 of shower tray 1' is thus elastically deformable within certain limits.

FIGS. 8 to 10 show a fourth embodiment of the invention. This embodiment differs from the embodiments shown in FIGS. 1 to 7 in that a floor element 1" according to the invention for installation in a floor of a sanitary room, in particular a bathroom, is designed as a shower floor element. The shower floor element 1" is intended for the installation of a shower or shower cell at floor level, the floor area 21 of which is covered with tiles or natural stone slabs. The shower floor element 1" is essentially plate-shaped for this purpose and can therefore also be described as a shower board.

The shower floor element 1" has, for example, a plate-shaped body (not shown) made of rigid foam, in which a drain opening 5 is formed. On the upper side of the plate-shaped body, a trough-shaped receptacle 2' is arranged, which has a drain socket that projects into or penetrates the drain opening 5. At the transition of the bottom 2.1 of the trough-shaped receptacle 2' to the drain socket, a shoulder is formed for the positive-locking reception of a drain grating 22. In particular, the trough-shaped receptacle 2' has a vertically projecting, circumferential web 2.2, which is preferably formed in one piece with the base 2.1 of receptacle 2'. The upper side of the plate-shaped body made of rigid foam is or is preferably provided with a sealing foil or sealing membrane (not shown) prior to the application of the trough-shaped receptacle 2', which is/is sealingly connected to the drain opening 5 or the drain socket. Outside the circumferential web 2.2 of the tub-shaped receptacle 2', the plate-shaped body coated with a sealing foil or sealing membrane in a liquid-tight manner is covered with tiles or natural stone slabs. The tiles or natural stone slabs are laid with a slight incline in the direction of the trough-shaped receptacle 2', whereby the upper edge of the circumferential web 2.2 is slightly lower than the upper side of the tiles or natural stone slabs. The circumferential web 2.2 corresponds to an end rail.

The trough-shaped receptacle 2' serves to accommodate a personal scale 3, which may correspond to the self-sufficient personal scale 3 shown in FIGS. 1 and 3. Likewise, the shower floor element 1" shown in FIG. 10 or the personal scale 3 used therein can be combined with a second display device 10. In order to avoid repetition regarding the configuration of the personal scale 3 as well as the configuration of the second display device 10, reference is made to the above description of the embodiment shown in FIGS. 1 to 3.

The execution of the invention is not limited to the embodiments shown in the attached drawing. Rather, numerous variants are conceivable which, even in the case of a configuration deviating from the embodiments shown, make use of the invention indicated in the attached claims. For example, a floor element 2' or a system according to the invention can also be placed independently of a shower or floor drain. The floor element 2' in accordance with the invention could be integrated flush with the floor of the bathroom or another room in the building and would then be part of the floor there.

The invention claimed is:

1. A floor element for installation in a floor of a building room comprising a receptacle in or on an upper surface of the floor element for receiving a personal scale or a measuring device for measuring a measured variable proportional to a weight force,
   wherein a drain opening is formed in the receptacle,
   wherein the receptacle is shaped to center the personal scale or the measuring device within the receptacle,
   wherein the receptacle is formed as a recess for receiving the person scale or the measuring device, and
   wherein the recess comprises elongated troughs configured to receive feet of the personal scale or the measuring device for centering the personal scale or the measuring device within the recess.

2. The floor element according to claim 1, wherein the floor element is designed as a shower tray or shower floor element.

3. The floor element according to claim 1, wherein the measuring device or the personal scale has a tread surface which, together with the receptacle, delimits an inlet gap.

4. The floor element according to claim 3, wherein the tread surface and the upper side of the floor element surrounding the receptacle are designed to be flush with one another.

5. The floor element according to claim 3, wherein a display device for displaying measured weight values and/or other measured values is integrated in the tread surface.

6. The floor element according to claim 1, wherein the measuring device or the personal scale is provided with one or more height-adjustable spacer elements.

7. The floor element according to claim 1, wherein the floor element is arranged on a floor element support which is provided with sensors for measuring a measured variable proportional to a weight force.

8. The floor element according to claim 1, wherein the floor element is provided on its underside with sensors for measuring a measured variable proportional to a weight force.

9. A system comprising a floor element according to claim 1 and a display device, wherein the display device can be remotely and/or variably positioned relative to the floor element.

10. The system according to claim 9, wherein the display device is provided with one or more operating elements for controlling a shower function and/or for the input of personal data.

11. The floor element according to claim 1, wherein the building room is a sanitary room.

12. The floor element according to claim 1, wherein the personal scale is an electronic personal scale or an electromechanical personal scale.

13. The floor element according to claim 1, wherein longitudinal axes of the elongated troughs run through the drain opening positioned in a bottom of the recess.

14. The floor element according to claim 13, wherein the recess comprises four elongated troughs arranged essentially at right angles to each other arranged around the drain opening.

* * * * *

UNITED STATES PATENT AND TRADEMARK OFFICE
CERTIFICATE OF CORRECTION

PATENT NO. : 11,287,307 B2
APPLICATION NO. : 16/867646
DATED : March 29, 2022
INVENTOR(S) : Frank Hennes It is certified that error appears in the above-identified patent and that said Letters Patent is hereby corrected as shown below:

On the Title Page

Column 2, item [56], Line 1, delete "Conomputer" and insert -- Computer --

Page 2, Column 1, item [56], Line 1, delete "Conomputer" and insert -- Computer --

In the Claims

Column 8, Line 14, Claim 1, delete "person scale" and insert -- personal scale --

Signed and Sealed this
Twenty-fourth Day of May, 2022

Katherine Kelly Vidal
*Director of the United States Patent and Trademark Office*